US010669974B2

(12) United States Patent
Palmer

(10) Patent No.: US 10,669,974 B2
(45) Date of Patent: Jun. 2, 2020

(54) METHOD AND APPARATUS FOR OXIDIZING ORGANIC FATS WITHIN AN INTERNAL COMBUSTION ENGINE

(71) Applicant: IONIZINGENERGY LIMITED, Devon (GB)

(72) Inventor: Bruce Palmer, Devon (GB)

(73) Assignee: IONIZINGENERGY LIMITED, Devon (GB)

( * ) Notice: Subject to any disclaimer, the term of this patent is extended or adjusted under 35 U.S.C. 154(b) by 0 days.

(21) Appl. No.: 15/773,251

(22) PCT Filed: Oct. 27, 2016

(86) PCT No.: PCT/GB2016/053336
§ 371 (c)(1),
(2) Date: May 3, 2018

(87) PCT Pub. No.: WO2017/077272
PCT Pub. Date: May 11, 2017

(65) Prior Publication Data
US 2018/0328319 A1    Nov. 15, 2018

(30) Foreign Application Priority Data

Nov. 6, 2015  (GB) .................................. 1519613.2
Apr. 7, 2016  (GB) .................................. 1605928.9

(51) Int. Cl.
*F02M 27/04*    (2006.01)
*F02M 53/02*    (2006.01)
(Continued)

(52) U.S. Cl.
CPC .............. *F02M 27/04* (2013.01); *C10L 1/02* (2013.01); *F02M 31/125* (2013.01);
(Continued)

(58) Field of Classification Search
CPC ...... F02M 27/04; F02M 31/125; F02M 31/16; F02M 53/02; F02M 57/00; C10L 1/02;
(Continued)

(56) References Cited

U.S. PATENT DOCUMENTS 6,851,413 B1 * 2/2005 Tamol, Sr. ............. F02M 27/04
                                                    123/536
2007/0181104 A1 * 8/2007 Collins ................... F02M 27/04
                                                    123/537

(Continued)

FOREIGN PATENT DOCUMENTS

GB       575907        3/1946
GB     2411436 A       8/2005
(Continued)

OTHER PUBLICATIONS

International Searching Authority, International Search Report and Written Opinion of the International Searching Authority, PCT/GB2016/053336, dated Jan. 23, 2017.

*Primary Examiner* — Joseph J Dallo
*Assistant Examiner* — Yi-Kai Wang
(74) *Attorney, Agent, or Firm* — Reichel Stohry Dean LLP

(57) ABSTRACT

It is widely appreciated that renewable sources of energy are desirable. In particular, in recent years the development of biodiesel has been encouraged in order to find a replacement for fossil fuels in internal combustion engines. Typically, such biodiesel is based on triacylglycerols of vegetable origin. Animal fat, due to its different chemical composition and production process presents additional challenges when attempted to be used as a source of fuel. Most known methods require extensive processing of naturally occurring fats in order for them to be usable in conventional engines. According to the present invention, there is provided a method of oxidizing organic fats within an internal com- (Continued)

bustion engine to generate power by applying a first electrical charge to an oxidizer (e.g. air) and applying a second electrical charge to the organic fat opposite in polarity to the first electrical charge. In this way, constituents of the organic fat to be oxidized are attracted to the oxidizer, in preference to an interior surface of the combustion chamber. Thus, carbonization of the interior surface of the combustion chamber is reduced, as material contributing to carbonization is retained within exhaust gas.

5 Claims, 1 Drawing Sheet

(51) Int. Cl.
  *F02M 31/16* (2006.01)
  *F02M 31/125* (2006.01)
  *C10L 1/02* (2006.01)
  *F02M 57/00* (2006.01)

(52) U.S. Cl.
  CPC ............ *F02M 31/16* (2013.01); *F02M 53/02* (2013.01); *F02M 57/00* (2013.01); *F23G 2900/7002* (2013.01); *F23K 2301/101* (2013.01); *F23K 2301/204* (2013.01); *Y02T 10/126* (2013.01)

(58) Field of Classification Search
  CPC ....... F23G 2900/7002; F23K 2301/101; F23K 2301/204; Y02T 10/126
  USPC ........................................................ 123/537
  See application file for complete search history.

(56) References Cited

U.S. PATENT DOCUMENTS

| | | | |
|---|---|---|---|
| 2007/0272220 A1* | 11/2007 | Rozim | F02M 27/08 |
| | | | 123/538 |
| 2010/0183993 A1* | 7/2010 | McAlister | F02M 21/0254 |
| | | | 431/254 |
| 2011/0239962 A1* | 10/2011 | Mungas | F02C 1/05 |
| | | | 123/3 |
| 2011/0247585 A1 | 10/2011 | Cheiky | |
| 2014/0130756 A1 | 5/2014 | McAlister | |
| 2016/0341117 A1* | 11/2016 | Ekstrom | F01K 5/00 |

FOREIGN PATENT DOCUMENTS

| | | |
|---|---|---|
| JP | H01232156 A | 9/1989 |
| JP | H0763129 A | 3/1995 |
| WO | WO 03/072925 A1 | 9/2003 |

\* cited by examiner

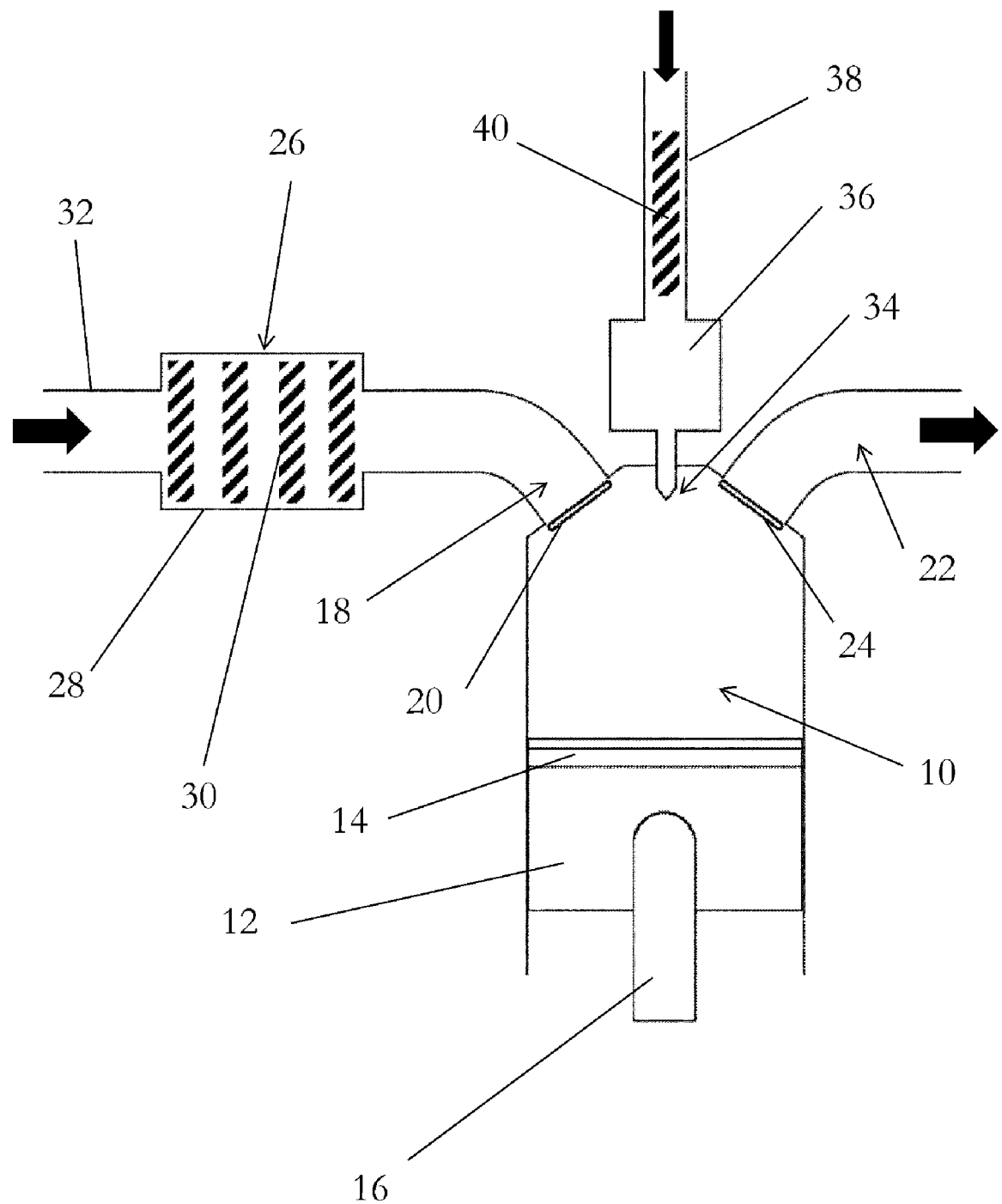

METHOD AND APPARATUS FOR OXIDIZING ORGANIC FATS WITHIN AN INTERNAL COMBUSTION ENGINE

PRIORITY

The present application is related to, and claims the priority benefit of, and is a 35 U.S.C. 371 national stage application of, International Patent Application Serial No. PCT/GB2016/053336, filed Oct. 27, 2016, which is related to, and claims the priority benefit of, a) Great Britain Patent Application Serial No. 1605928.9, filed Apr. 7, 2016, and b) Great Britain Patent Application Serial No. 1519613.2, filed Nov. 6, 2015. The contents of each of these applications are hereby incorporated by reference in their entirety into this disclosure.

TECHNICAL FIELD

The present invention relates generally to a method of oxidizing organic fats within an internal combustion engine to generate power, and an internal combustion engine for carrying out said method, and finds particular, although not exclusive, utility in the burning of animal fats as an alternative to diesel fuel.

BACKGROUND

It is widely appreciated that renewable sources of energy are desirable. In particular, in recent years the development of biodiesel has been encouraged in order to find a replacement for fossil fuels in internal combustion engines. Typically, to make biodiesel, vegetable oils are reacted with alcohols (usually methanol), but in any event the majority of research into biodiesel has focussed on combustion of triacylglycerols of vegetable origin.

Animal fat, due to its different chemical composition and production process presents additional challenges when attempted to be used as a source of fuel.

One method of producing biodiesel from animal fat comprises transesterification, which results in fatty acid esters having physical characteristics that are very close to those of diesel fuel. Furthermore, the methyl or ethyl esters of fatty acids can be burned directly in unmodified diesel engines.

Another method of producing renewable diesel from animal fat is to hydrogenate tallow by reacting it with hydrogen at elevated pressure and temperature.

Engines may be run on certain forms of alternative fuel without significant problems; however, the fuel injectors' maintenance schedule must be modified to incorporate more frequent cleaning and nozzle replacement due to deposit formation.

Each of the above methods requires extensive processing of naturally occurring fats in order for them to be usable in conventional engines.

Some research has been conducted into use of neat (i.e. substantially non-chemically altered) fats in internal combustion engines. For example, pre-heating is a simple way to alter properties of viscous fuels like animal fat; however, excessive carbonization may still occur.

Excessive carbonization in the combustion chamber may increase the compression ratio, which may cause rough running or detonation, and may even cause pistons to seize, holes to be burned in the pistons, damage to bearings and potentially broken cranks. Excessive carbonization on the piston and piston ring may result in heat transfer to the cylinder being reduced, resulting in over-heating and/or eventually seizure. Excessive carbonization around the exhaust port and in the exhaust system may cause the engine to choke.

BRIEF SUMMARY

According to a first aspect of the present invention, there is provided a method of oxidizing organic fats within an internal combustion engine to generate power, comprising the steps of: providing an internal combustion engine having a combustion chamber, a fuel intake to the combustion chamber, and an oxidizer intake to the combustion chamber; providing an oxidizer to be used within the internal combustion engine; applying a first electrical charge to the oxidizer; introducing the charged oxidizer into the combustion chamber via the oxidizer intake; providing organic fat to be oxidized within the internal combustion engine; applying a second electrical charge to the organic fat; introducing the charged organic fat into the combustion chamber via the fuel intake; and oxidizing the charged organic fats in the combustion chamber to generate power; wherein the first electrical charge has a substantially opposite polarity to the second electrical charge.

In this way, constituents of the organic fat to be oxidized are attracted to the oxidizer, in preference to an interior surface of the combustion chamber. Thus, carbonization of the interior surface of the combustion chamber is reduced, as material contributing to carbonization is retained within exhaust gas.

The organic fats may comprise fats and oils; that is, lipid materials that are either solid or liquid at room temperature, respectively. The organic fats may comprise animal fats and/or may be vegetable fats. The organic fats may comprise triglycerides. The organic fats may be obtained through rendering, clarifying, heating, separating (e.g. in a centrifuge) and/or filtering. The organic fats may be neat organic fats; that is, the organic fats may be substantially non-chemically altered from the form in which they were present in the animal/vegetable from which they have been obtained. The organic fats may be fluid, in particular liquid or a suspension of solid and liquid.

The organic fats may comprise entirely and/or predominantly (i.e. greater than 50%, in particular 60%, more particularly 70%, for instance 80% or 90%): fatty acids, made of a hydrocarbon chain that terminates with a carboxylic acid group; glycerolipids, including mono- and di-substituted glycerols, including at least one highly polar hydroxyl group; glycerophospholipids, including a negatively charged phosphate group; sphingolipids, formed of a sphingosine backbone that is O-linked to a charged head group (such as ethanolamine, serine or choline), and amide-linked to an acyl group, such as a fatty acid; sterol lipids, such as cholesterol, terminating in a highly polar hydroxyl group; prenol lipids, terminating in a highly polar hydroxyl group; saccharolipids, in which a monosaccharide substitutes for the glycerol backbone present in glycerolipids and glycerophospholipids; and/or polyketides.

The organic fats may be substantially pure organic fats; that is comprising less than 10%, in particular 5%, more particularly 2%, for instance 1% or 0.5%): petrol, alkanes (having a general chemical formula $C_nH_{2n+2}$), cycloalkanes (having a general chemical formula $C_nH_{2(n+1-g)}$, where g is the number of rings in the molecule), alkenes (having a general chemical formula $C_nH_{2n}$) with between 4 and 12 carbon atoms per molecule, diesel, alkanes, cycloalkanes, alkylbenzenes, naphthalene with between 10 and 15 carbon atoms per molecule, biodiesel, fatty acid esters of the form RCOOR', where the R is a long-chain alkyl group, and R' is a methyl group, an ethyl or a propyl group.

The internal combustion engine may be any known form of internal combustion engine, for instance a reciprocating engine (e.g. a petrol/gasoline engine and/or a diesel engines), a rotary engine (e.g. a Wankel engine), a combustion turbine, etc.

The combustion chamber may be a cylinder inside which a piston is movable. Movement of the piston within the cylinder may rotate a crankshaft, which may be via a connecting rod.

The oxidizer may be air, oxygen, hydrogen peroxide, or any other suitable oxidiser, or combination thereof. The oxidizer may be fluid, in particular liquid (for example, liquid hydrogen peroxide). The liquid may be vaporised prior to introduction into the combustion chamber. The liquid may be vaporised before the first electrical charge is applied.

Alternatively, the liquid may be vaporised after the first electrical charge is applied. That is, for example, the first electrical charge may be applied to at least one oxidiser (e.g. air), and then the liquid oxidiser may be vaporised into the electrically charged oxidiser. Similarly, it is envisaged that where a combination of oxidisers are provided to the combustion chamber, only some of the oxidisers are electrically charged before insertion therein.

The concentration of hydrogen peroxide may be between 1% and 100%, in particular between 10% and 70%, more particularly between 20% and 50%, for example approximately 30%, 35% or 40%, for instance diluted with water.

The proportion of vaporised hydrogen peroxide added to air as the oxidiser may be in a range of 0.025% to 25% by mass or volume, in particular between 0.5% and 10%, more particularly between 1% and 5%, for example 2%. Measurement of mass or volume of the hydrogen peroxide may comprise measurement of the diluted hydrogen peroxide (e.g. the hydrogen peroxide and water in which it is diluted) or may comprise measurement of the hydrogen peroxide excluding the water in which it is diluted.

The fuel intake may comprise the oxidizer intake, and/or the oxidizer intake may comprise the fuel intake. In particular, the combustion chamber may have a single intake for fuel and oxidiser. Alternatively, the oxidizer intake may be an air intake, and/or the fuel intake may be a fuel injector, for instance similar to fuel injectors used in diesel engines.

The method may further comprise pre-heating the organic fat prior to introduction into the combustion chamber, for instance to a temperature sufficient for the organic fat to be in a liquid state, for example, pre-heating to at least 40, 50, 60, 70, 80, 90, 100 or 110 degrees centigrade. The step of pre-heating the organic fat may precede or follow the step of applying a second electrical charge to the organic fat.

The step of applying a first electrical charge to the oxidizer may comprise passing the oxidizer adjacent to at least one first charged electrode.

The first charged electrode may comprise a wire. The wire may be coiled. The wire may comprise stainless steel. The first charged electrode may be positively charged; alternatively it may be negatively charged. The first charged electrode may be held at a positive or negative voltage with a magnitude of at least 10 kV, 20 kV, 30 kV or 35 kV. The at least one first charged electrode may comprise a single first charged electrode, or alternatively a plurality of first charged electrodes, arranged for instance in series or parallel. The at least one first charged electrode may be disposed within a container, such as a portion of pipe, box or discrete unit. The container may be substantially the same as corresponding portions of fluid transfer conduit either side of the container (for example, a portion of pipe of the same, reduced or enlarged cross-sectional area); alternatively, the container may be a discrete component (for example a box).

The step of applying a second electrical charge to the organic fat may comprise passing the organic fat adjacent to at least one second charged electrode.

The second charged electrode may comprise a wire. The wire may be coiled. The wire may comprise stainless steel. The second charged electrode may be negatively charged; alternatively it may be positively charged. The second charged electrode may be held at a negative or positive voltage with a magnitude of at least 10 kV, 20 kV, 30 kV or 35 kV. The at least one second charged electrode may comprise a single second charged electrode, or alternatively a plurality of second charged electrodes, arranged for instance in series or parallel. The at least one second charged electrode may be disposed within a container, such as a portion of pipe, box or discrete unit. The container may be substantially the same as corresponding portions of fluid transfer conduit either side of the container (for example, a portion of pipe of the same, reduced or enlarged cross-sectional area); alternatively, the container may be a discrete component (for example a box).

The first charged electrode may be held at a voltage substantially opposite that of the second charged electrode. That is, the first and second charged electrodes may be held at opposite polarities, and may be of substantially the same magnitude.

The method may further comprise the steps of providing an alternating electrical voltage and splitting the positive and negative phases to supply the positive voltage portions of the alternating electrical voltage to a first one of the first and second charged electrodes, and the negative voltage portions of the alternating electrical voltage to a second one of the first and second charged electrodes.

The step of splitting may comprise half-wave rectification of the alternating electrical voltage for supply to each of the first and second charged electrodes.

The method may further comprise providing a generator to supply the alternating electrical voltage. The method may further comprise passing the alternating electrical voltage supplied by the generator, and/or the split positive and negative voltages, through a transformer to step-up the voltage.

The internal combustion engine, for instance including any supply pipes, the combustion chamber, pistons, exhaust outlet and/or any other portion that may come into contact with electrically charged fat or oxidizer, and/or the first and/or second containers may comprise an electrically non-conductive material. For instance, the internal combustion engine and/or the first and/or second containers may be made from a ceramic material, boron nitride or any other suitable material as is understood in the art, may be powder coated, and/or may be electrically insulated and/or isolated from adjacent components such as a generator set. In this regard, the definition of internal combustion engine may or may not include portions that do not come into contact with electrically charged fat or oxidiser in normal use, such as the crank shaft.

The method may further comprise adding a silicone material to the organic fats, for instance for lubrication and/or anti-foaming purposes. Other additives may be added to the organic fats in a similar manner to that which is common for diesel fuel, as is known in the art.

The method may further comprise pumping the charged organic fats into the combustion chamber with a pump. In this way, a desired amount of the organic fats may be injected into the combustion chamber at a desired pressure.

The method may further comprise removing soot from exhaust gas, for instance by using a catalyst system, afterburner system, particulate filter, or any other suitable soot removal system.

The above-described method could be applied to engines of any power output, in particular those in the range of 2 to 3 MW, more particularly approximately 2.5 MW.

According to a second aspect of the present invention, there is provided an internal combustion engine for oxidizing organic fats therein, comprising: a combustion chamber; an organic fat intake to the combustion chamber; an oxidizer intake to the combustion chamber; an oxidizer charging device for applying a first electrical charge to oxidizer to be introduced into the combustion chamber via the oxidizer intake; and an organic fat charging device for applying a second electrical charge to organic fat to be introduced into the combustion chamber via the fuel intake; wherein the first electrical charge has a substantially opposite polarity to the second electrical charge.

The oxidizer charging device may comprise a first charged electrode, and the organic fat charging device may comprise a second charged electrode. The oxidizer charging device may further comprise a first container within which the first charged electrode is disposed. The organic fat charging device may further comprise a second container within which the second charged electrode is disposed.

The internal combustion engine may further comprise an organic fat pre-heater, for pre-heating the organic fat prior to introduction into the combustion chamber and/or the organic fat charging device.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference FIGURES quoted below refer to the attached drawings.

FIG. 1 is schematic representation of an internal combustion engine according to an embodiment of the present invention.

DETAILED DESCRIPTION

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "connected", used in the description, should not be interpreted as being restricted to direct connections only. Thus, the scope of the expression "a device A connected to a device B" should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other. For instance, wireless connectivity is contemplated.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any embodiment or aspect of the invention may be combined in any suitable manner, as would be apparent to one of ordinary skill in the art from this disclosure, in one or more embodiments or aspects.

Similarly, it should be appreciated that in the description various features of the invention are sometimes grouped together in a single embodiment, FIGURE, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances.

The principles of the invention will now be described by a detailed description of at least one drawing relating to exemplary features of the invention. It is clear that other arrangements can be configured according to the knowledge of persons skilled in the art without departing from the underlying concept or technical teaching of the invention, the invention being limited only by the terms of the appended claims.

FIG. 1 is schematic representation of a portion of an internal combustion engine according to an embodiment of the present invention. The internal combustion engine comprises a cylinder 10, inside which is located a reciprocating piston 12 complete with sealing piston ring 14. A connecting rod 16 couples the piston 12 to the crankshaft (not shown), such that movement of the piston 12 by virtue of explosive combustion of fuel within the cylinder 10 causes the crankshaft to rotate.

The cylinder 10 is provided with an air intake 18, which can be selectively sealed by an intake valve 20 in a conventional manner. Similarly, an exhaust 22 is provided, which is similarly selectively sealed by an exhaust valve 24.

Upstream of the air intake 18 is provided an air charging unit 26 composed of a container 28 in which are disposed a series of four coiled steel wires 30 each charged by a voltage of +35 kV. In this way, air supplied to the cylinder 10 is first positively charged as it passes over the coiled steel wires. An air supply pipe 32 feeding the air charging unit 26, the air charging unit 26 itself, the air intake 18, the air intake valve 20 together with the cylinder 10, piston 12, piston ring 14, exhaust valve 24 and exhaust are all substantially electrically non-conducting. In this way, the positive charge of the air can be ensured.

A fuel injector 34 is provided to inject fuel into the cylinder 10 in a manner similar to that in a conventional diesel engine. A pump 36 is provided to supply the fuel to the fuel injector 34. Prior to introduction to the pump 36, the fuel (in this case organic fats) is pre-heated to approximately 90 degrees centigrade in a pre-heater (not shown) before being passed through a section of pipe 38 in which is contained a further coiled steel wire 40 charged by a voltage of −35 kV. In this way, organic fat supplied to the cylinder 10 is first negatively charged as it passes over the coiled steel wire.

The pipe 38, pump 36 and fuel injector 34 are all substantially electrically nonconducting. In this way, the negative charge of the organic fat can be ensured.

The positively charged air is combined with the negatively charged organic fat at high temperature and pressure within the electrically non-conducting cylinder such that matter within the organic fat (i.e. either being fat, oil or other impurities) is preferentially attracted to the air, in preference to the cylinder 10 or other non-conducting components of the internal combustion engine. Thus, the organic fat, and combustion products, have a tendency to become entrained within the air fluid flow such that deposition within the engine, including carbonization, is reduced.

The invention claimed is:

1. A method of oxidizing organic fats within an internal combustion engine to generate power, comprising the steps of:
   providing an internal combustion engine having a combustion chamber, a fuel intake to the combustion chamber, and an oxidizer intake to the combustion chamber;
   providing an oxidizer to be used within the internal combustion engine, the oxidizer comprising a combination of air and hydrogen peroxide;
   vaporizing the hydrogen peroxide;
   applying a first electrical charge to the oxidizer;
   introducing the charged oxidizer into the combustion chamber via the oxidizer intake;
   providing organic fat to be oxidized within the internal combustion engine
   applying a second electrical charge to the organic fat;
   introducing the charged organic fat into the combustion chamber via the fuel intake; and
   oxidizing the charged organic fats in the combustion chamber to generate power;
   wherein the first electrical charge has a substantially opposite polarity to the second electrical charge.

2. The method of oxidizing organic fats within an internal combustion engine to generate power of claim 1, further comprising the step of pre-heating the organic fat prior to introduction into the combustion chamber.

3. The method of oxidizing organic fats within an internal combustion engine to generate power of claim 1, wherein the step of applying a first electrical charge to the oxidizer comprises passing the oxidizer adjacent to at least one first charged electrode.

4. The method of oxidizing organic fats within an internal combustion engine to generate power of claim 1, wherein the step of applying a second electrical charge to the organic fat comprises passing the organic fat adjacent to at least one second charged electrode.

5. An internal combustion engine for oxidizing organic fats therein, comprising:
   a combustion chamber;
   an organic fat intake to the combustion chamber;
   an oxidizer intake to the combustion chamber configured to receive a combination of air and vaporized hydrogen peroxide;
   an oxidizer charging device for applying a first electrical charge to oxidizer to be introduced into the combustion chamber via the oxidizer intake; and
   an organic fat charging device for applying a second electrical charge to organic fat to be introduced into the combustion chamber via the fuel intake;

wherein the first electrical charge has a substantially opposite polarity to the second electrical charge.

* * * * *